United States Patent
Blahut

(10) Patent No.: US 12,140,450 B2
(45) Date of Patent: Nov. 12, 2024

(54) MAP DATA UPDATING METHOD AND SYSTEM

(71) Applicant: NNG Szoftverfejlesztőés Kereskedelmi Kft., Budapest (HU)

(72) Inventor: György Gábor Blahut, Budapest (HU)

(73) Assignee: NNG Szoftverfejleszt és Kereskedelmi Kft., Budapest (HU)

( * ) Notice: Subject to any disclaimer, the term of this patent is extended or adjusted under 35 U.S.C. 154(b) by 204 days.

(21) Appl. No.: 17/790,874

(22) PCT Filed: Nov. 17, 2020

(86) PCT No.: PCT/HU2020/050053
§ 371 (c)(1),
(2) Date: Jul. 5, 2022

(87) PCT Pub. No.: WO2021/140347
PCT Pub. Date: Jul. 15, 2021

(65) Prior Publication Data
US 2023/0035071 A1 Feb. 2, 2023

(30) Foreign Application Priority Data
Jan. 8, 2020 (HU) .................................. P2000007

(51) Int. Cl.
*G06F 17/00* (2019.01)
*G01C 21/00* (2006.01)

(52) U.S. Cl.
CPC ..... *G01C 21/3896* (2020.08); *G01C 21/3878* (2020.08); *G01C 21/3881* (2020.08)

(58) Field of Classification Search
CPC ............ G01C 21/3896; G01C 21/3878; G01C 21/3881; G01C 21/32
(Continued)

(56) References Cited

U.S. PATENT DOCUMENTS

| 9,863,774 B2 * | 1/2018 | Gonopolskiy ..... G01C 21/3859 |
| 10,739,786 B2 * | 8/2020 | Milstein ............. G01C 21/3867 |

(Continued)

FOREIGN PATENT DOCUMENTS

WO 20180006082 1/2018

OTHER PUBLICATIONS

Jomrich, 'Dynamic Map Update Protocol for Highly Automated Driving Vehicles', SCITEPRESS—Science and Technology Publications, 2017 (Year: 2017).*

(Continued)

*Primary Examiner* — Matthew Ell
*Assistant Examiner* — Matthew J Ludwig
(74) *Attorney, Agent, or Firm* — Wood Herron & Evans LLP

(57) ABSTRACT

The invention is a map data updating method for updating map data on a client device (10) by means of a server (11) storing a latest version of the map data, wherein the map data comprises map tiles having layers. The server (11) stores association information defining groups of associated layers, wherein each layer in a group is updated on the client device (10) if an update request for at least one layer in the group is received by the server (11) from the client device (10). The invention also relates to a map data updating system, a computer program product and a computer-readable medium for implementing the method.

9 Claims, 2 Drawing Sheets

(58) Field of Classification Search
USPC .......................................................... 701/451
See application file for complete search history.

(56) References Cited

U.S. PATENT DOCUMENTS

| | | | | |
|---|---|---|---|---|
| 10,982,964 | B2* | 4/2021 | Lee | G01C 21/34 |
| 2006/0173614 | A1* | 8/2006 | Nomura | G01C 21/3881 |
| | | | | 701/425 |
| 2010/0030460 | A1* | 2/2010 | Sawai | G01C 21/3815 |
| | | | | 701/532 |
| 2011/0130951 | A1* | 6/2011 | Lee | G01C 21/3878 |
| | | | | 709/219 |
| 2014/0058661 | A1* | 2/2014 | Choi | G09B 29/106 |
| | | | | 701/428 |
| 2015/0370828 | A1* | 12/2015 | Maurer | G06F 16/2228 |
| | | | | 707/722 |
| 2017/0322036 | A1* | 11/2017 | Gonopolskiy | G01C 21/3859 |
| 2018/0003512 | A1* | 1/2018 | Lynch | G01C 21/3811 |

OTHER PUBLICATIONS

European Patent Office, International Search Report in PCT Application No. PCT/HU2020/050053, Apr. 9, 2021 (3 pgs.) and Written Opinion of the international Searching Authority (6 pgs.).

* cited by examiner

MAP DATA UPDATING METHOD AND SYSTEM

This application claims priority, under Section 371, and/or as a continuation under Section 120, to PCT Application No. PCT/HU2020/050053, filed on Nov. 17, 2020, which claims priority to Hungarian Application No. P2000007 HU, filed on Jan. 8, 2020.

TECHNICAL FIELD

The invention relates generally to a map data updating method for updating map data on a client device by means of a server storing a latest version of the map data, the map data comprising map tiles having layers. The invention also relates to a system, a computer program product and a computer-readable medium for carrying out the invention.

BACKGROUND ART

Car navigation systems generally offer a function to guide a current position based on a map or to guide a route to a desired destination. The existing car navigation systems may be classified into map-stored navigation systems and map-streaming navigation systems. In the former, a terminal device stores map data therein and, based on the stored map data, detects its current position and performs route guidance. In the latter, the terminal device operates by receiving real-time map data from a server through a network.

Map-stored navigation systems have a fast operating speed because of using stored map data, but require a frequent update of the stored map data because of inevitable changes in map data due to passage of time. Map-streaming navigation systems can always offer the newest map data to users because it receives map data of local area from a server via a network throughout their operations. However, prior art map-streaming navigation systems require much time for receiving and displaying map data.

There are already known methods and systems for partial map data updates in the prior art.

US 2014/0058661 A1 discloses a real-time map data updating system comprising a service device configured to store map data including one or more of physical level data which expresses a specific area on one or more scales, one or more of tile data which indicates given-sized division of the specific area, and one or more of layer data which shows classified information on a map. The service device is configured to provide the map data in one or more units of level, layer and tile units at an update request of a terminal device; and the terminal device configured to perform a route guidance function based on the stored map data, to determine parts for update in the stored map data in level, layer and tile units according to update conditions, to receive map data of the determined parts by sending a request to the service device, and to apply the received map data to the stored map data.

US 2016/0275131 A1 discloses version management for incrementally compiled map data. This known method comprises receiving a request for map data for a tile associated with a tile identifier; accessing, by a processor, a tile compatibility table with the tile identifier, wherein the tile compatible table includes a plurality of tile version identifiers for the tile indexed by a single monotonically ascending map version number; receiving a compatible tile identifier from the tile compatibility table; receiving data indicative of a compatible map version from the tile compatibility table; and providing the compatible tile and the compatible map version in response to the request for map data.

US 2015/0066366 A1 discloses partial map updates by means of a method, implemented in a computer system. The map data is divided into pre-selected map portions, such as a layers, and the update may be limited to only the changed layers of a new version of the map data.

US 2015/0370828 A1 discloses tile-based distribution of searchable geospatial data to client devices. In this known system the memory of a user device stores map data for rendering a digital map of a geographic area. The memory also stores searchable geospatial data organized into tiles. Each tile corresponds to a respective portion of the geographic area of a substantially same size. The geospatial data includes, for each of the tiles, descriptions of one or more geographic entities and a location of the one or more geographic entities, within the corresponding portion of the geographic area. To update certain geospatial data on the client device, the network server does not need to resend the entire set of geospatial data for a relatively large geographic area, and instead it can update only the changed tiles. In this manner, the client device and the network server can gradually update the cache without transmitting a large amount of data at once. Moreover, to increase the coverage of geospatial area at the client device, the network server can send a set of tiles adjacent to those already available in the cache, and the mapping application can rebuild the search index using the already-stored tiles and the new tiles to cover the additional area in addition to the original area.

According to US 2016/0179841 A1, changes made in one version of a map database are propagated to earlier and/or different versions of the database. In some examples, several versioned layers of the database are maintained. Changes may propagated among the layers forward in time and backward in time or version sequence. A forward propagation refers to a change from an earlier (lower version number) database to a newer (higher version number) database. A reverse propagation refers to a change from a newer database to an earlier database. The, server in this known system may define and use delta differences as the changes between various versions.

Accordingly, using delta updates, or in other word delta update patches is a known solution for updating relatively large files. A delta update is an update that only requires to transfer the data-part that has changed, not the whole file or database. It can significantly save time and bandwidth. A patch is generally called a set of changes to a file, designed to update it. Especially for minor changes, it is often easier and more economical to distribute patches rather than redistributing a newly recompiled or reassembled file. This technique is also called delta-compression streaming, if transfer of the delta update patches is effected in the framework of streaming. For example, instead of downloading the full content of a map tile when a change was made within the tile, the content of two tile versions can be compared and only the delta can be downloaded and applied to the previously streamed data.

A still further know technique is the so called NDS map data format (Navigation Data Standard: https://nds-association.org), which offers the unique ability to select independent tiles and layers of the map and stream them on demand. As a result, required map data can be streamed and cached on-the-fly. Cloud navigation utilizes the vehicle's cellular connection to deliver the navigation experience. Streaming NDS maps on-demand can reduce the data load significantly. Instead of whole countries or update regions, only selected, actually needed data is downloaded to the navigation system, for example the data along a route. However, when it comes to a living map in the cloud, re-streaming frequent changes may require an annual cellular data plan of the vehicle and that is a significant cost factor.

DISCLOSURE OF THE INVENTION

There is a need for a map data updating method and a system for updating map data on a client device by means of a server, preferably in the framework of a cloud-based streaming, which enables delta updates in a more efficient way than in prior art solutions.

There is also a need for a map data updating method and system which enable group-wise updating of layers of tile based map data based on predetermined rules, thereby reducing overhead in the streaming communication.

One aspect of the present invention provides a map data updating method according to claim 1. Another aspect of the present invention provides a map data updating system according to claim 8. Still further aspects of the present invention provide a computer-readable medium according to claim 7. Preferred embodiments are defined in the independent claims.

BRIEF DESCRIPTION OF THE DRAWINGS

Preferred embodiments of the invention are described below by way of example with reference to the following drawings, where.

MODES FOR CARRYING OUT THE INVENTION

Figure 1:
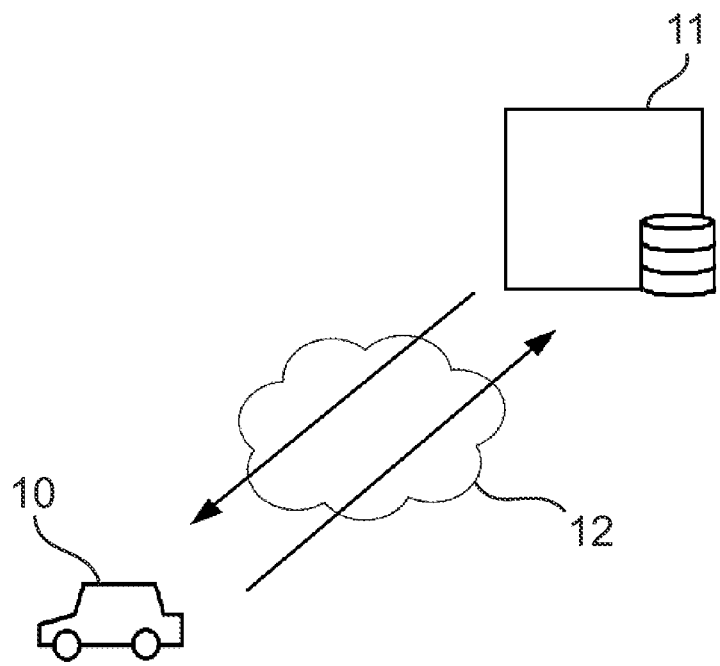
FIG. 1 is a schematic drawing of a embodiment of the invention depicting the communication channel between the server and the client device.

Hereinafter, a preferred embodiment of the present invention will be described in detail with reference to the accompanying drawings. However, to avoid obscuring the subject matter of the present invention, well known functions or configurations will be omitted from the following descriptions and drawings. Further, the same elements will be designated by the same reference numerals although they are shown in different drawings.

As depicted in FIG. 1, the inventive map data updating method is implemented in a system comprising a client device 10 and a server 11, wherein the communication between the server 11 and the client device 10 is preferably implemented on a mobile network 12. Of course, the communication channel can be implemented in any other suitable way that enables the data sending and receiving functionalities as detailed below. The client device 10 can be a vehicle navigation unit, e.g. in a car, but other types of client devices, such as mobile phones, personal computers or other intelligent devices are also conceivable.

Figure 2:
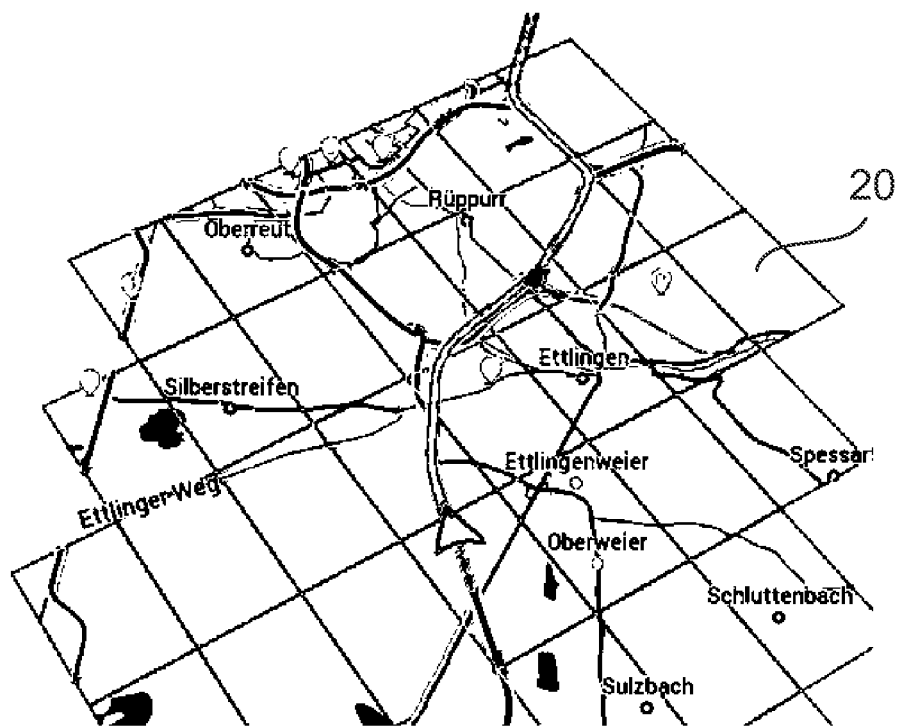
FIG. 2 is an example of map data comprising tiles.

FIG. 2 is a schematic representation of a map data, wherein the map data comprises or consists of tiles 20 having layers, e.g. as known in the prior art, e.g. from US 2014/0058661 A1 or US 2016/0275131 A1, as well as from the NDS map data format.

The map data updating method is used for updating map data on the client device 10 by means of the server 11, which stores a latest version of the map data as server data. For this purpose, the server 11 also stores association information defining groups of associated layers, wherein each layer in a group is updated on the client device 10 if an update request for at least one layer in the group is received by the server 11 from the client device 10.

Figure 3A:
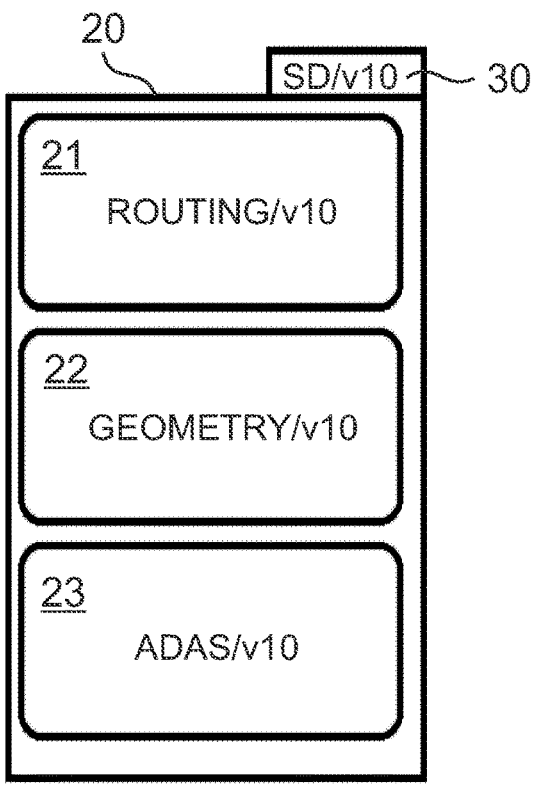
FIGS. 3A-3C are schematic representations of subsequent update-versions of a tile having layers.
Figure 3B:
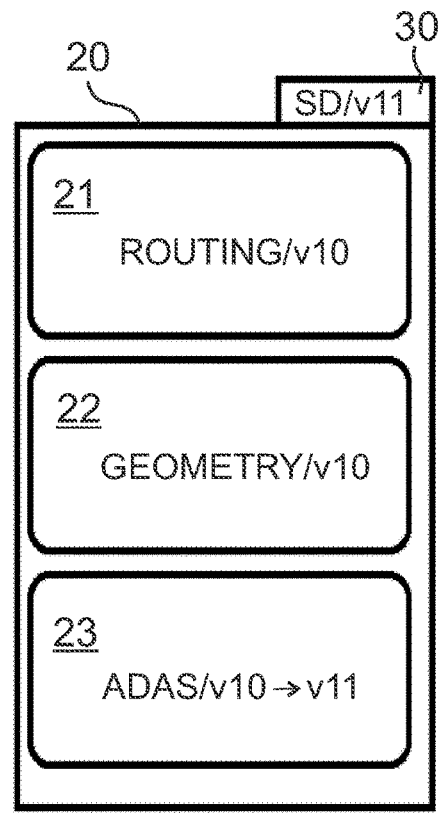
Figure 3C:
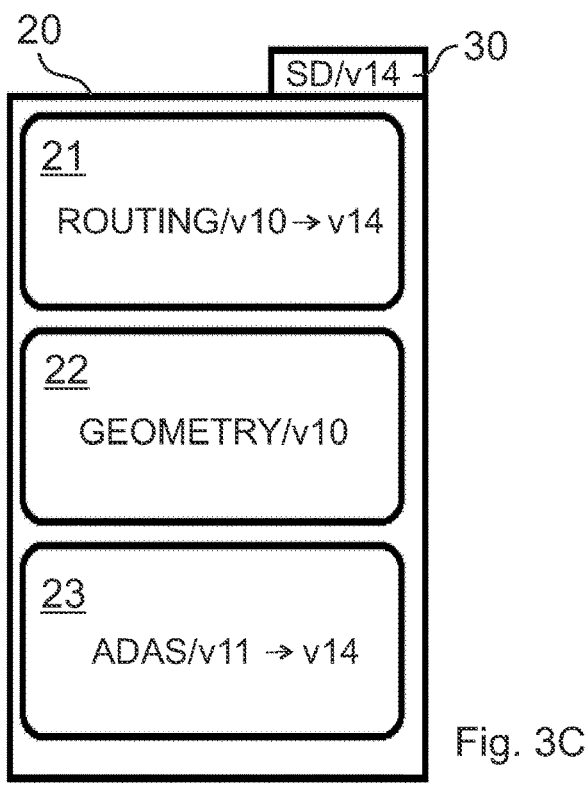

FIGS. 3A-3C show various update statuses of a tile 20. The map data update method comprises the steps of receiving an update request from a client device 10 for updating a layer 21, 22, 23 in the client device 10, the update request also comprising an identifier 30 of the last confirmed server data version, at which the layer 21, 22, 23 in the client device 10 was last confirmed to correspond with the actual server data, checking at the server 11 whether the layer 21, 22, 23 requested to be updated belongs to a group of associated layers 21, 22, 23, and if yes, updating each of the layers 21, 22, 23 of the respective group by sending to the client device 10 for each associated layer 21, 22, 23 a respective delta update patch if the layer 21, 22, 23 as in the latest server data version differs from the layer 21, 22, 23 as in the last confirmed server data version, or information indicating that the layer 21, 22, 23 is up to date if the layer 21, 22, 23 as in the latest server data version does not differ from the layer 21, 22, 23 as in the last confirmed server data version, wherein the delta update patch represents a difference between the layer 21, 22, 23 as in the latest server data version and the layer 21, 22, 23 as in the last confirmed server data version, and an identifier of the latest server data version as the identifier 30 of the last confirmed server data version.

Accordingly, in the client device 10, assigned to the particular group of associated layers 21, 22, 23, e.g. to layers 21, 22, 23 of a tile 20, an identifier 30 of the last confirmed server data version is also stored. FIGS. 3A-3C represent a case in which the association information defines a group of associated layers 21, 22, 23 within the same tile 20. It is conceivable that any other association of layers is possible in the sense of the invention, e.g. the association of layers of the same type belonging to neighbouring tiles or all the layers of neighbouring tiles. Any suitable groups of layers can be formed, preferably on the basis of predetermined rules as detailed later on.

In the depicted embodiment, identifier 30 indicates for the entire tile 20, i.e. for all layers 21, 22, 23 of the tile 20, which particular server data version they correspond to.

In an initial state depicted in FIG. 3A, the client device 10 obtains the current version (v10) of the map data for the tile 20 and the identifier 30 assigned to the tile 20 stores a value corresponding to the current version of the server data SD/v10.

Subsequently, as depicted in FIG. 3B, the ADAS layer 23 data changes, e.g. an arch of a road is corrected in the map database. The client 10 downloads this data upon an update request, and the ADAS layer 23 version changes to the current one (v11), while the version of the other layers 21, 22 in the group, i.e. in the present case in the layer 20, remains the earlier one (v10). In the group wise update, the client device 10 acknowledges that the routing layer 21 and the geometry layer 22 are been approved by the server 11 as being up-to-date, so the identifier 30 stores for the entire group that the version of the corresponding server data SD/v11 is the most current one.

In the depicted example there are no changes for a while in the area corresponding to the tile 20. At e.g. the next two update requests, only confirmations are received that the layers 21, 22, 23 are up-to-date, i.e. the layers 21, 22, 23 as in the latest server data version do not differ from the layers 21, 22, 23 as in the last confirmed server data version. Alternatively, sending update patches of zero content may also be conceivable. Accordingly, only the identifier 30 changes during these confirmations, in our example twice (from v11 to v12, and from v12 to v13); such a case is also denoted as update in the context of the invention.

In a next step of FIG. 3C, in a next server data version (v14), the contents of the routing layer 21 and of the ADAS layer 23 change, and after that an update request relating to the routing layer 21 or to both the routing layer 21 and the geometry layer 22 is received by the server 11 from the client device 10. The changes of the routing layer 21 and of the ADAS layer 23 are assumingly of small extent, so the server 11 sends these data together to the client device 10. In generating the respective delta update patches, the server 11 has to know that a difference between versions v10 and v14 is to be generated for the routing layer 21, while a difference between versions v11 and v14 is to be generated for the ADAS layer 23. Exactly for this purpose is the identifier 30 needed. In the absence of this information, the client device 10 could only send the version identifier (v10) of the layer(s) requested to be updated, and the server 11 could not know whether the delta update patch for the ADAS layer 23 is to be generated for the difference between versions v10 and v14 or for the difference between versions v11 and v14. By obtaining this identifier 30 of the last confirmed server data version (v13) from the client device 10, the server 11 will know that the respective latest layer versions up to the server data version of the obtained identifier 30 is to be used for generating the difference. The identifier 30 assigned to the tile 20 stores thereafter a value corresponding to the current version of the server data SD/v14. Using delta updates, or in other words delta update patches, reduces the cellular data load for NDS cloud-based navigation, enabling efficient and cost-effective map streaming.

In the communication depicted in FIG. 1 an update request is sent to the server 11, while the server 11 may send various types of responses to the client device 10. If the client device 10 does not have any data for the particular groups of layers, e.g. all the layers of a complete tile, the full data, e.g. the full tile data will be transferred. If the update request relates to data which is up-to-date in the client device 10, a version confirmation message is sent only updating the identifier 30. In case of any differences of existing data on the client device 10 and on the server 11, a differential data update is sent to the client device 10.

The identifier 30 in FIGS. 3A-3C is assigned to an entire tile 20. In the framework of the invention, such an identifier 30 is assigned to each group of associated layers, so that the group-wise updating can be effected in the inventive way. Accordingly, the identifier 30 may not be assigned to entire tiles 20 but also to groups of tiles or any suitable groups of layers 21, 22, 23.

The association information is predetermined in the server 11 by taking into account at least one of the following association criteria:
associating layers 21, 22, 23 of the same tile 20,
associating layers 21, 22, 23 of the same type of neighbouring tiles 20.

Any association of layers into groups is possible in the sense of the invention. The predetermined rules for this can be based e.g. on the probability that the client device 10 will use the associated data, even if only one layer or only a part of the layers in that group are requested to be updated. These predetermined rules can be based e.g. on geographical particulars, such as map densities, on travel route probabilities, on earlier searches of a user of the client device 10, or on earlier/frequent routes, etc.

In defining the rules of associating layers, various considerations can be used. One of these considerations may be the probability of use of all or a considerable part of the associated information by the client device 10.

Another consideration can be the total size of the delta update patches in a group, e.g. for ensuring a lower limit to for the overhead in the communication with the client device 10. Association of layers is carried out if the total size reaches a predetermined lower limit generally, or e.g. for at least one particular possible update. The predetermined lower limit may be determined by ensuring e.g. at most 5%, preferably at most 10% overhead in the communication with the client device 10. In this way a limited overhead can be ensured in the communication with respect to the useful data. In case if a HTTP communication is used, URL information represents an overhead part of the communication in the update request, as the client device 10 has to indicate the identifier of the data to be downloaded. In the response sent by the server 11, the header information represents the overhead. In the light of these overheads, grouping the data to be sent enables a more efficient data transfer. In case if—for limiting the overhead—additional map data update is sent to the client device 10, even if the probability of use of the additional data is not very high, a more efficient communication and update can be achieved. In this way, optimizing the layer-based map update packages can be achieved.

A further consideration for the association of the layers can be a surrounding of the vehicle, or a horizon or a possible route of the vehicle.

It is conceivable that not only routing, geometry and ADAS layers 21, 22, 23, but any other types of layers can be used in the map data according to the given application. Examples of further possible types of layers in the map data are the lane layer, or the name layer.

The update request sent from the client device 10 may relate to updating more than one layer at the same time, which layers can belong to the same group or to different groups. If the layers belong to the same group, the update is effected as detailed above, while in a request relating to layers belonging to different groups, all the respective groups are updated in the inventive way.

If the map data is stored according to the Navigation Data Standard NDS, the map data comprises a routing layer 21 and a geometry layer 22 for each tile 20. Preferably, in this case for each tile 20 at least its routing layer 21 and its geometry layer 22 are associated in a group, and the update request always relates to updating (at least) the routing layer 21 and the geometry layer 22. In the NDS standard, the routing layers 21 and the geometry layer 22 are usually changed more frequently and these layers 21 and 22 are usually subject to small changes. Accordingly, the corresponding data has relatively small size and updates for these layers 21 and 22 are preferably requested together, at the same time. The ADAS layer 23, however, has usually a large size, so updating this layer 23 is to be effected only if using the ADAS data is necessary or is highly probable. It is to be avoided to update superfluous ADAS data.

The identifier 30 of the last confirmed server data version is preferably an incremental version number of the server data or a time stamp issued by the server 11.

After each change in the server data, for the changed layers 21, 22, 23 thereof, the delta update patches between the latest version of the layer 21, 22, 23 and earlier versions thereof are generated, and the delta update patches are stored in the server 11 for eventual respective future layer update requests. In this way the update data is prepared in the server 11 for future possible use, resulting in a fast response to update requests. In order to avoid excessive storage needs, stored delta update patches can be deleted according to predetermined rules, e.g. older or larger ones with respect to predetermined limits, etc.

The associations preferably do not change in time. Once a decision has been made for creating a group of associated layers for group update, that association remains for subsequent operation. In case a change is needed in the associations, a suitable re-association and a respective full or partial update can be effected for the changed groups.

The inventive method can be carried out in a map data updating system described above, wherein the server 11 comprises a computer program including instructions cause the server 11 to carry out the method steps. A computer program product and a computer-readable medium for the same purpose are also within the scope of the present invention.

According to the present invention, when a terminal device stores map data and performs route guidance based on the stored map data, the stored map data is partially updated in real time in a combination of one or more of physical level, tile and layer units according to update conditions of the terminal device. It is therefore possible to offer route guidance based on the newest geographic information with user's waiting time minimized.

Also, in update of map data, this invention allows an effective update with minimized user inconvenience by updating in real time just the minimum information required for operation and transmissible based on a travel state and speed of the terminal device and a network state.

As a result, this invention can remarkably enhance user convenience by taking advantages of both a map-stored system and a map-streaming system.

The map data updating method in this invention may be implemented in the form of software being readable through a variety of computer means and be recorded in any computer-readable medium. Here, this medium may contain, alone or in combination, program instructions, data files, data structures, and the like. These program instructions recorded in the medium may be specially designed and constructed for the present invention or well known to persons in the field of computer software. Program instructions may include machine language codes made by a complier and high-level language codes executable in a computer using an interpreter or the like. These hardware devices may be configured to operating as one or more of software to perform the operation of this invention, and vice versa.

While this invention has been particularly shown and described with reference to an exemplary embodiment thereof, it will be understood by those skilled in the art that various changes in form and details may be made therein without departing from the subject matter of the invention. Specific terms used in this disclosure and drawings are used for illustrative purposes and not to be considered as a limitation of the present invention.

The present invention may be used for a variety of terminal devices that store map data and perform a specific function based on the stored map data, and particularly, may provide route guidance based on the newest geographic information with minimized user's waiting time by partially updating in real time the stored map data in a combination of one or more of physical level, tile and layer units according to update conditions of the terminal device.

Also, in update of map data, this invention allows an effective update with minimized user inconvenience by updating in real time just the minimum information required for operation and transmissible based on a travel state and speed of the terminal device and a network state.

Embodiments of the invention described above, or portions thereof, may be implemented using one or more computer devices or systems, collectively referred to herein as a "computer". Computers may include a processor, a memory, an input/output (I/O) interface, and a Human Machine Interface (HMI). A computer may also be operatively coupled to one or more external resources via a network. External resources may include, but are not limited to, servers, databases, mass storage devices, peripheral devices, cloud-based network services, or any other resource that may be used by the computer.

The processor of the computer may operate under the control of an operating system that resides in memory. The operating system may manage computer resources so that computer program code embodied as one or more computer software applications, such as an application residing in memory, may have instructions executed by the processor. One or more data structures may also reside in memory, and may be used by the processor, operating system, or application to store or manipulate data.

The I/O interface may provide a machine interface that operatively couples the processor to other devices or systems. Applications running on the computer may thereby work cooperatively with external resources or networks to provide the various features, functions, applications, processes, or modules comprising embodiments of the invention. The application may also have program code that is executed by one or more external resources, or otherwise rely on functions or signals provided by other system or network components external to the computer. Indeed, given the nearly endless hardware and software configurations possible, persons having ordinary skill in the art will understand that embodiments of the invention may include applications that are located externally to the computer, distributed among multiple computers or other external resources, or provided by computing resources (hardware and software) that are provided as a service over a network, such as a cloud computing service.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations or elements embodying the various aspects of the embodiments of the invention. Computer-readable program instructions for carrying out operations of the embodiments of the invention may be, for example, assembly language, source code, or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified or implied by such nomenclature.

Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile tangible media, and removable and non-removable tangible media implemented in any method or technology for storage of data, such as computer-readable instructions, data structures, program modules, or other data. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, or operations specified in flowcharts, sequence diagrams, or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, or operations specified in flowcharts, sequence diagrams, or block diagrams.

The terminology used herein is for the purpose of describing particular embodiments only and is not intended to be limiting of the embodiments of the invention. As used herein, the singular forms "a", "an" and "the" are intended to include both the singular and plural forms, and the terms "and" and "or" are each intended to include both alternative and conjunctive combinations, unless the context clearly indicates otherwise. It will be further understood that the terms "comprises" or "comprising," when used in this specification, specify the presence of stated features, integers, actions, steps, operations, elements, or components, but do not preclude the presence or addition of one or more other features, integers, actions, steps, operations, elements, components, or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the invention has been illustrated by a description of various embodiments, and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

The invention is, of course, not limited to the preferred embodiments described in details above, but further variants, modifications and developments are possible within the scope of protection determined by the claims. Furthermore, all embodiments that can be defined by any arbitrary dependent claim combination belong to the invention.

The invention claimed is:

1. A map data updating method for updating map data on a client device (10) by means of a server (11) storing a latest version of the map data as server data, the map data comprising map tiles (20) having layers (21, 22, 23), characterized by using a server (11) also storing association information defining groups of associated layers (21, 22, 23), wherein each layer (21, 22, 23) in a group is updated on the client device (10) if an update request for at least one layer (21, 22, 23) in the group is received by the server (11) from the client device (10), the method comprising the steps of receiving an update request from a client device (10) for updating a layer (21, 22, 23) in the client device (10), the update request also comprising an identifier (30) of the last confirmed server data version, at which the layer (21, 22, 23) in the client device (10) was last confirmed to correspond with the actual server data, checking at the server (11) whether the layer (21, 22, 23) requested to be updated belongs to a group of associated layers (21, 22, 23), and if yes, updating each of the layers (21, 22, 23) of the respective group by sending to the client device (10) for each associated layer (21, 22, 23)

a respective delta update patch if the layer (21, 22, 23) as in the latest server data version differs from the layer (21, 22, 23) as in the last confirmed server data version, or information indicating that the layer (21, 22, 23) is up to date if the layer (21, 22, 23) as in the latest server data version does not differ from the layer (21, 22, 23) as in the last confirmed server data version, wherein the delta update patch represents a difference between the layer (21, 22, 23) as in the latest server data version and the layer (21, 22, 23) as in the last confirmed server data version, and an identifier of the latest server data version as the identifier (30) of the last confirmed server data version, wherein the association information is predetermined in the server (11) by taking into account the following selection criteria: associating the layers (21, 22, 23) of the same type of neighbouring tiles (20), and wherein after each change to the layer (21, 22, 23) in the server data, the delta update patch is generated using the latest version of the layer (21, 22, 23) and earlier versions thereof, and the delta update patch is stored in the server (11) so as to be accessible for future layer update requests, and wherein the association information is predetermined in the server (11) by also taking into account a total size of the delta update patch in the group of associated layers (21, 22, 23), wherein association of the layers (21, 22, 23) is carried out if the total size reaches a predetermined lower limit.

2. The method according to claim 1, characterized in that the update request relates to updating more than one layer (21, 22, 23) in the same group.

3. The method according to claim 2, characterized in that the map data is stored according to the Navigation Data Standard (NDS), wherein the map data comprises a routing layer (21) and a geometry layer (22) for each tile (20), and for each tile (20) at least its routing layer (21) and its geometry layer (22) are associated in a group, and the update request relates to updating the routing layer (21) and the geometry layer (22).

4. The method according to claim 1, characterized in that the identifier (30) of the last confirmed server data version is an incremental version number of the server data or a time stamp issued by the server (11).

5. The method according to claim 1, characterized by only generating and/or storing delta update patches in the server (11) which comply with a predetermined condition relating to the probability of use for an update.

6. The method according to claim 1, characterized in that the predetermined lower limit is determined by ensuring at most 5%, preferably at most 10% overhead in the communication with the client device (10).

7. A computer-readable medium comprising instructions which, when executed by a computer, cause the computer to carry out the method of claim 1.

8. A map data updating system for updating map data on a client device (10), the system comprising a server (11) storing a latest version of the map data as server data, the map data comprising map tiles (20) having layers (21, 22, 23), characterized in that the server (11) is adapted to also store association information defining groups of associated layers (21, 22, 23), the association information enabling updating on the client device (10) each layer (21, 22, 23) in a group based on an update request of the client device (10) for at least one layer (21, 22, 23) in the group, wherein the server (11) comprises a computer program including instructions that cause the server (11)

to receive an update request from a client device (10) for updating a layer (21, 22, 23) in the client device (10), the update request also comprising an identifier (30) of the last confirmed server data version, at which the layer (21, 22, 23) in the client device (10) was last confirmed to correspond with the actual server data, to check whether the layer (21, 22, 23) requested to be updated belongs to a group of associated layers (21, 22, 23), and if yes, to update each of the layers (21, 22, 23) of the respective group by sending to the client device (10) for each associated layer (21, 22, 23)

a respective delta update patch if the layer (21, 22, 23) as in the latest server data version differs from the layer (21, 22, 23) as in the last confirmed server data version, or information indicating that the layer (21, 22, 23) is up to date if the layer (21, 22, 23) as in the latest server data version does not differ from the layer (21, 22, 23) as in the last confirmed server data version, wherein the delta update patch represents a difference between the layer (21, 22, 23) as in the latest server data version and the layer (21, 22, 23) as in the last confirmed server data version, and an identifier of the latest server data version as the identifier (30) of the last confirmed server data version, to predetermine the association information in the server (11) by taking into account: associating the layers (21, 22, 23) of the same type of neighbouring tiles (20), and a total size of the delta update patch in the group of associated layers (21, 22, 23), wherein association of the layers (21, 22, 23) is carried out if the total size reaches a predetermined lower limit, and to generate, after each change in the layer (21, 22, 23) in the server data, the delta update patch between the latest version of the layer (21, 22, 23) and earlier versions thereof, and to store the delta update patch in the server (11) for eventual respective future layer update requests.

9. The system according to claim 8, characterized in that the server (11) comprises a communication unit enabling the server (11) to communicate with the client device (10) on a mobile network (12).

\* \* \* \* \*